United States Patent [19]
Endo et al.

[11] Patent Number: 5,709,831
[45] Date of Patent: Jan. 20, 1998

[54] METHOD OF PRODUCING CONNECTOR WITH REAR HOLDER

[75] Inventors: Takayoshi Endo; Yuji Hatagishi; Nolio Kawamura; Junichi Hamamoto; Motohisa Kashiyama; Yasuhiro Yamaguchi; Toshihiko Yamamoto; Takeyuki Hamaguchi, all of Shizuoka, Japan

[73] Assignee: Yazaki Corporation, Tokyo, Japan

[21] Appl. No.: 655,237

[22] Filed: Jun. 5, 1996

[30] Foreign Application Priority Data

Jun. 5, 1995 [JP] Japan .................................. 7-138077
Dec. 28, 1995 [JP] Japan .................................. 7-342956

[51] Int. Cl.⁶ .............................. B29C 45/14; B29C 45/40
[52] U.S. Cl. ...................... 264/238; 264/318; 264/328.1; 264/334; 439/736; 439/752
[58] Field of Search .............................. 439/736, 752; 264/238, 318, 328.1, 334, 336

[56] References Cited

FOREIGN PATENT DOCUMENTS 55-92284  6/1980  Japan .
5226025  9/1993  Japan .

Primary Examiner—Jill L. Heitbrink
Attorney, Agent, or Firm—Sughrue, Mion, Zinn, Macpeak & Seas, PLLC

[57] ABSTRACT

A method of producing a connector with a rear holder, wherein a housing 2 and a rear holder 3 are molded separately from each other by a set of molds 31 to 34. After molding, one of the molds (33) is moved to form a space between the housing 2 and the rear holder 3, and using another (34) of the molds, the rear holder 3 is moved toward the housing 2, thereby provisionally retaining the rear holder 3 on the housing 2.

6 Claims, 13 Drawing Sheets

METHOD OF PRODUCING CONNECTOR WITH REAR HOLDER

BACKGROUND OF THE INVENTION

1. Field of the Invention

This invention relates to a method of producing a connector with a rear holder in which connection terminals, received in a connector housing (hereinafter referred to as a "housing"), are retained by the rear holder, and more particularly to a method of producing a connector with a rear holder in which the rear holder is attached to the connector housing in an improved manner.

2. Description of the Related Art

Various electronic devices, including CPUs, are used in current automobiles, and therefore wire harnesses and many connectors are also used therein. One example of such a connector is disclosed in Japanese Utility Model Unexamined Publication No. 55-92284, and will be described with reference to FIGS. 22 and 23.

A connector housing 171 of this connector has a plurality of terminal receiving chambers 172, and a notch 173 of a generally annular shape is formed in an axially-central portion of the connector housing 171. The terminal receiving chambers 172 are open to the exterior through this notch 173, and part of each partition wall 174 is exposed. Retaining projections 175 are formed on an outer surface of the opposite-side retaining projections 174.

As shown in FIG. 23, a stepped portion 177 is provided in the terminal receiving chamber 172, and when a connection terminal 181 is inserted into the terminal receiving chamber 172, a stamped pawl 185 of the terminal 181 is engaged with the stepped portion 177, thereby preventing rearward withdrawal of the terminal 181.

The connection terminal 181 includes a wire connection portion 182, and an electrical contact portion 183 for connection to a mating connector. A wire 184 is clamped and connected to the wire connection portion 182.

A rear holder 191, comprising two halves, fits in the notch 173, and each rear holder half includes receiving grooves 192 for respectively receiving the associated partition walls 174, and fitting grooves 193 for respectively receiving the associated wires 184. Outer walls of the opposite-side receiving grooves 192 serve as elastic retaining arms 194, respectively.

To assemble the connector, each connection terminal 181 having a wire 184 connected thereto is inserted in the associated terminal receiving chamber 172 to a predetermined position, and then the rear holder 191 is fitted on the housing 171, so that the elastic retaining members 194 are engaged with the retaining projections 175, respectively.

As a result, the wires 184 are fitted in the respective fitting grooves 193 in the rear holder 191 so that the rear holder 191 engages the rear ends of the wire connection portions 182, as shown in FIG. 23. Therefore, the connection terminal 181 is retained in a double manner through the engagement of the stamped pawl 185 with the stepped portion 177 and through the engagement of the wire connection portion 182 with the rear holder 191.

Another conventional connector will be described with reference to FIGS. 24 to 27. This connector is disclosed, for example, in Japanese Patent Unexamined Publication No. 5-226025.

As shown in FIG. 24, a rear holder 203 is integrally connected to a rear end portion of a connector housing 201 through flexible hinges 202, and a shallow receiving recess 201a for receiving a main plate 203a of the rear holder 203 is formed in a rear end portion of an upper wall of the connector housing 201. Upper openings 204a of a plurality of terminal receiving chambers 204 are open to this receiving recess 201a, and terminal retaining projections 205, corresponding respectively to the openings 204a, are formed on the inner side of the rear holder 203.

Each terminal retaining projection 205 is connected to the rear holder main plate 203a through a connecting portion 205a, and projects forward beyond the rear holder main plate 203a. Provisionally-retaining projections 206 are formed respectively on opposite sides of the lower end portion of the terminal retaining projection 205, and the width of the terminal retaining projection 205, including the opposite-side provisionally-retaining projections 206, is slightly smaller than the width of the opening 204a.

The steps of assembling the connector will be described sequentially. Each terminal retaining projection 205 is press-fitted into the associated opening 204a, and therefore the connecting portion 205a is abutted against the upper wall 207 of the housing 201, with the provisionally-retaining projections 206 engaged with the inner edge portions of the opening 204a. In this manner, the rear holder 203 is provisionally retained relative to the housing 201, as shown in FIG. 26.

In this provisionally-retained condition, connection terminals 81 are inserted respectively into the terminal receiving chambers 204, and are retained by elastic retaining piece portions 208, respectively.

Then, the rear holder 203 is tilted to disengage the terminal retaining projections 205 from the upper wall 207, and the terminal retaining projections 205 are moved obliquely downward, and the connecting portions 205a are inserted respectively into the openings 204a.

At this time, a completely-retaining projection 206a, formed at the rear end of each connecting portion 205a, is engaged with the edge portion of the opening 204a, thereby completely retaining the rear holder, as shown in FIG. 27. In this retained condition, the terminal retaining projection 205 is disposed immediately adjacent to a rear end of an electrical contact portion 83 of the connection terminal 81, thereby retaining the connection terminal 81 in a double manner.

In the connector shown in FIGS. 22 and 23, however, the housing and the rear holder are molded independently of each other by separate molds, and are supplied to a wire harness assembly factory. Therefore, the housings and the rear holders must be examined, packaged, and stored independently of each other, and this requires much time and labor, which increases the cost of the connector.

Similarly, in the wire harness assembly factory, much time and labor are required for handling the connector parts, and this also, together with storage control, increases the cost of the assembly operation.

In the connector shown in FIGS. 24 to 27, although the housing and the rear holder are molded integrally with each other, the rear holder is unstable in this condition. Therefore, after molding, the rear holder is placed in the provisionally-retained condition and the connector is supplied to the wire harness assembly factory. In the wire harness assembly factory, the connection terminals are inserted, and the rear holder is pushed in and completely retained. Thus, despite the fact that the rear holder is integral with the housing, the time and labor required for assembly is high, which increases the manufacturing cost of the connector.

SUMMARY OF THE INVENTION

The present invention has been made in view of the above problems, and an object of the invention is to provide a method of producing a connector with a rear holder in which time and labor required for assembling the connector can be reduced.

The above object of the invention has been achieved by the following methods (1) to (6) of producing a connector with a rear holder, wherein a plurality of connection terminals are received in a connector housing, and are retained in a double manner by the rear holder:

(1) molding the connector housing and the rear holder using a set of molds; subsequently moving the mold interposed between the connector housing and the rear holder, thus forming a space between the connector housing and the rear holder; and finally urging the mold held in contact with an outer side of the rear holder to move the rear holder toward the connector housing and to engage the connector housing, thereby provisionally retaining the rear holder on the connector housing;

(2) molding the connector housing and the rear holder integrally with each other by the use of a set of molds such that the connector housing and the rear holder are connected together through a hinge; moving the resin-pouring mold to expose the connector housing and the rear holder; moving the mold holding the rear holder, thereby allowing the hinge to be flexibly deformed; and subsequently urging the rear holder to engage the connector housing by means of a cylinder ram, thereby provisionally retaining the rear holder on the connector housing;

(3) method (2), in which after the rear holder is provisionally retained on the connector housing, an ejector pin, supporting the connector housing, is driven to remove the connector housing from the mold;

(4) molding the connector housing and the rear holder integrally with each other by the use of a set of molds such that the connector housing and the rear holder are connected together through a hinge; moving the resin-pouring mold to expose the connector housing and the rear holder; moving the mold holding the rear holder, thereby allowing the hinge to be flexibly deformed; and subsequently moving the mold, disposed adjacent to an outer surface of the mold and having a slide pin passed therethrough, toward the connector housing to urge the rear holder to engage the connector housing, thereby provisionally retaining the rear holder on the connector housing;

(5) elastically deforming a pair of elastic, provisionally-retaining portions formed on the connector housing away from each other by a mold for molding the connector housing; subsequently urging the rear holder to be located between the pair of provisionally-retaining portions by the mold, and retainingly engaging the rear holder with the provisionally-retaining portions; and (6) positioning the rear holder, molded integrally with the connector housing, by a rear holder support portion formed on a mold for molding the connector housing; and subsequently urging the rear holder to engage the connector housing by means of a slider reciprocally movably mounted on the mold, thereby retaining the rear holder on the connector housing.

In the method (1) of the invention for producing a connector with a rear holder, the housing and the rear holder are molded by a set of molds, and after molding, one mold of the set of molds is moved, thus forming a space between the housing and the rear holder. Then, the rear holder is moved to engage the housing, using another one of the molds, thereby provisionally retaining the rear holder on the housing.

Therefore, at the stage at which the housing is removed from the mold, the separate rear holder is kept provisionally retained on the housing, the connector can be handled as a unitary product, the storage control of the parts as well as transport is easy, and the time and labor required for production of the connector can be reduced.

In methods (2) and (3) of the invention, the housing and rear holder are molded integrally with each other by the set of molds, and after molding, part of the mold is moved to expose the housing and the rear holder in the mold. Then, the rear holder is engaged with the housing, using the cylinder. After the rear holder is thus provisionally retained, the housing is removed from the mold by the ejector pin.

Therefore, at the stage at which the housing is removed from the mold, the rear holder is kept provisionally retained, storage control of the parts as well as transport is easy, and the cost of the connector can be reduced.

In method (4) of the invention, the housing and the rear holder are molded integrally with each other by a set of molds, and after molding, one of the molds, whose movement is limited by a slide pin, is moved toward the housing, thereby provisionally retaining the rear holder on the housing.

Therefore, at the stage at which the housing is removed from the mold, the rear holder is provisionally retained, storage control of the parts as well as transport is easy, and the cost of the connector can be reduced.

In method (5) of the invention, a pair of elastic, provisionally-retaining portions, formed on the connector housing, are elastically deformed away from each other by the mold for molding the connector housing, and the rear holder is urged in between the pair of provisionally-retaining portions by the mold. Then, by moving the mold, the rear holder is retainingly engaged with the provisionally-retaining portions.

In this way, provisionally-retaining projections formed on the rear holder are prevented from being damaged, and assembly efficiency can be enhanced.

In method (6), the rear holder is supported by the rear holder support portion formed on the mold for molding the housing. Therefore, the rear holder can be properly positioned, and the provisionally-retaining operation in which the rear holder is provisionally retained on the connector by moving the mold can be effected positively and stably.

DETAILED DESCRIPTION OF THE PREFERRED EMBODIMENTS

Figure 1:
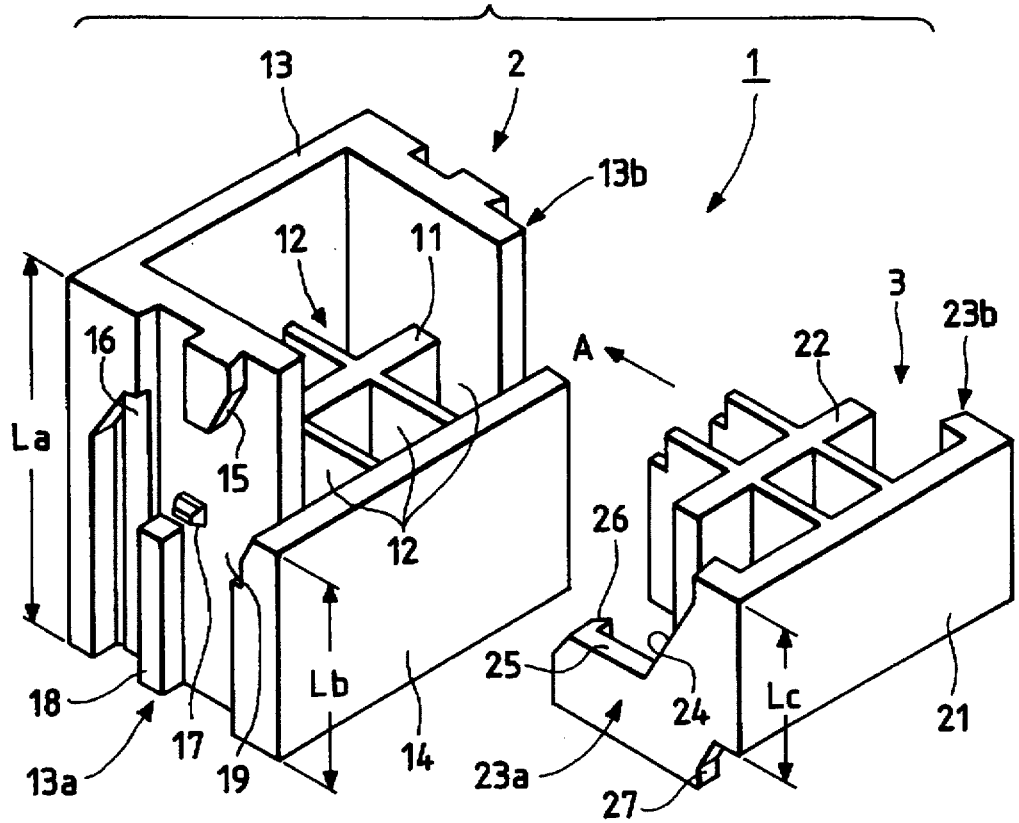
FIG. 1 is an exploded, perspective view of a connector with a rear holder according to a first embodiment of the invention.

A method of producing a connector with a rear holder according to a first embodiment of the invention will now be described with reference to FIGS. 1 to 7. The construction of the connector will first be described for convenience, and then the production method including the assembling operation will be described.

The connector 1 of this embodiment comprises the housing 2, the rear holder 3, and connection terminals 4 retained in a double manner by the housing 2 and the rear holder 3. The housing 2 and the rear holder 3 are molded of a synthetic resin, and the housing 2 and the rear holder 3 are connected together.

The housing 2 has terminal receiving chambers 12 separated from one another by a lattice-like partition wall 11, and has an open portion to which the rear holder 3 can be attached. More specifically, the housing 2 has a wall 13 (having a length La) defining three sides thereof, and the other side of the housing 2 is closed by a wall 14 having a length Lb. The rear holder 3 is opposed to the upper side of the wall 14, and then is fittingly attached to the housing 2.

The rear holder 3 has a rear wall 21 having a length Lc, and the dimensions of the connector are such that when the rear holder 3 is fittingly attached to the housing 2, La=Lb+Lc. Six spaces, separated from one another by a partition wall 22, are provided on the side of the wall 21 facing the housing 2. This partition wall 22 is disposed in registry with the partition wall 11 of the housing 2 when the rear holder 3 is attached to the housing 2.

Therefore, when the rear holder 3 is attached to the housing 2, the six spaces, formed by the partition wall 22, communicate respectively with the terminal receiving chambers 12, so that the terminal receiving chambers 12, which are originally short, are made long by the six spaces.

Arms 23a and 23b are formed respectively at the opposite ends of the wall 21 to cover the opposite sides of the partition wall 22. Each of the arms 23a and 23b has a slanting surface portion 24 and a horizontal extension portion 25, and a retaining portion 26 is formed at a distal end of the horizontal extension portion 25. A retaining hole (not shown), used when retaining the rear holder 3 on the housing 2, is formed in the inner surface of the horizontal extension portion 25 (this operation will be described later).

For attaching the rear holder 3 to the housing 2, the rear holder 3 is moved or pushed in the direction of arrow A (that is, in a horizontal direction), and then is moved obliquely downward to be attached to the housing 2. Various means for guiding this movement and for retaining the rear holder are formed on outer surfaces of opposed wall portions 13a and 13b of the wall 13.

The wall portions 13a and 13b are symmetrical in construction, and each of them has an abutment portion (or slanting surface) 15 for stopping the rear holder 3 when it is pushed from the direction of arrow A; a vertical, elongate retaining projection 16 for retaining the retaining portion 26 and for downwardly guiding the same; a retaining projection 17 for engagement in the retaining hole formed in the inner surface of the horizontal extension portion 25; an elongate support portion 18 for abutment against the lower side of the arm 23a (23b); and a positioning portion 19 for fitting in an associated one of the notches 27, formed respectively in the opposite ends of the rear wall 21 at the lower side thereof, for positioning purposes.

In the conventional technique for connecting such a housing and rear holder together, the housing and the rear holder are first molded separately from each other, and then the housing and the rear holder are attached together in an assembling step.

In this embodiment, however, using molds for molding the housing 2 and the rear holder 3, the rear holder 3 is attached to the housing 2 subsequent to the molding of the housing 2 and the rear holder 3, thereby greatly reducing the time and labor required for the operation.

Figure 2:
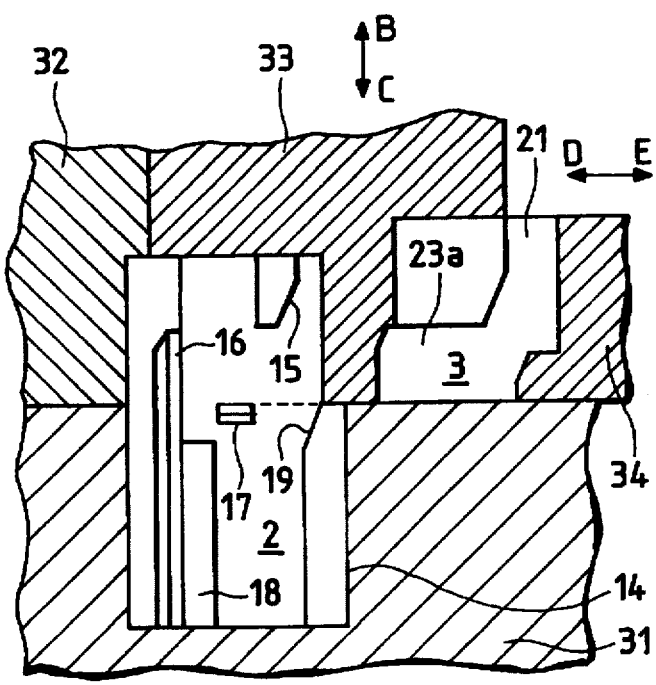
FIG. 2 is a schematic, cross-sectional view showing the construction of molds for molding a housing.

As shown in FIG. 2, the mold structure for molding the housing 2 and the rear holder 3 mainly comprises a lower mold 31 and three upper molds 32, 33 and 34. These molds 31 to 34 cooperate with one another to mold the housing 2 and the rear holder 3. The lower mold 31 serves as a base when attaching the rear holder 3 to the housing 2, and the first upper mold 32 serves as a holder.

The second upper mold 33 is movable upward and downward, that is, in directions of arrows B and C, and the third upper mold 34 is movable horizontally, that is, in directions of arrows D and E.

When connecting the housing 2 and the rear holder 3 together, the third upper mold 34 is moved in the direction of arrow D, and hence serves much like a cylinder ram for assembling purposes.

For molding the housing 2 and the rear holder 3, the lower mold 31 and the upper molds 32 to 34 are first combined together as shown in the drawings, and filled with a resin through filling holes (not shown), so that the housing 2 and the rear holder 3 are molded as shown at a central portion of the drawings. Although not shown in FIG. 2, a mold is further provided above the third upper mold 34, and closes the upper side of the third upper mold 34.

After the housing 2 and the rear holder 3 are molded, the second upper mold 33 is moved in the direction of arrow B to form a space between the housing 2 and the rear holder 3. Then, the third upper mold 34 is moved in the direction of arrow D to move the rear holder 3 toward the housing 2, the rear holder 3 sliding over the lower mold 31.

At this time, the upper surface of the lower mold 31 is disposed at the same height or level as that of (that is, flush with) the upper edge of the wall 14 of the housing 2, and the upper edge of the wall 14 and the upper surface of each retaining projection 17 are disposed at the same level, as indicated by a broken line. Therefore, when the rear holder 3 is urged in the direction of arrow D by the third upper mold 34, the arms 23a and 23b are first brought into contact with the upper edge of the wall 14, and then are brought into contact with the respective retaining projections 17.

When the rear holder 3 is further urged, the retaining portions 26 (see FIG. 1), formed respectively at the distal ends of the arms 23a and 23b, slide over the respective retaining projections 16, and are retainingly engaged therewith. The arms 23a and 23b then rest respectively on the retaining projections 17 and thereby prevent the rear holder 3 from dropping, so that the rear holder 3 is provisionally retained (that is, preset) on the housing 2, as shown in FIG. 3.

Figure 4:
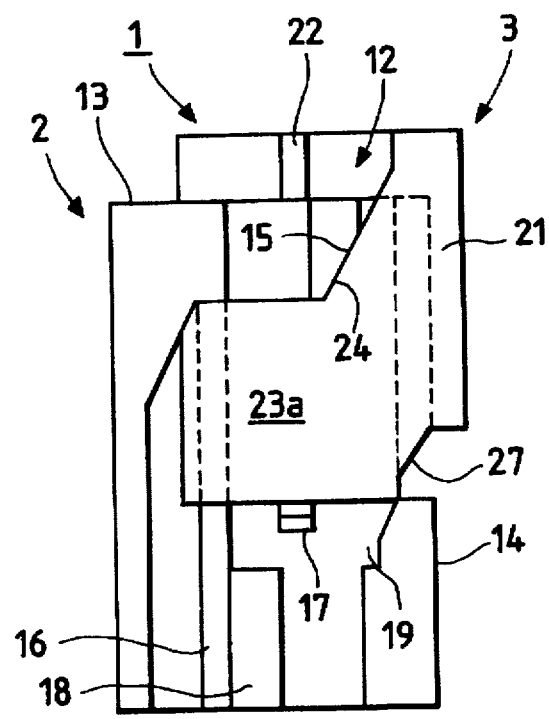
FIG. 4 is a side-elevational view showing the provisionally-retained condition of the rear holder of FIG. 3.

In the preset condition, each abutment portion 15 of the housing 2 is abutted against the associated slanting surface portion 24 of the rear holder 3, and the lower end of each notch portion 27 is engaged with the positioning portion 19, as shown in FIG. 4.

Figure 3:
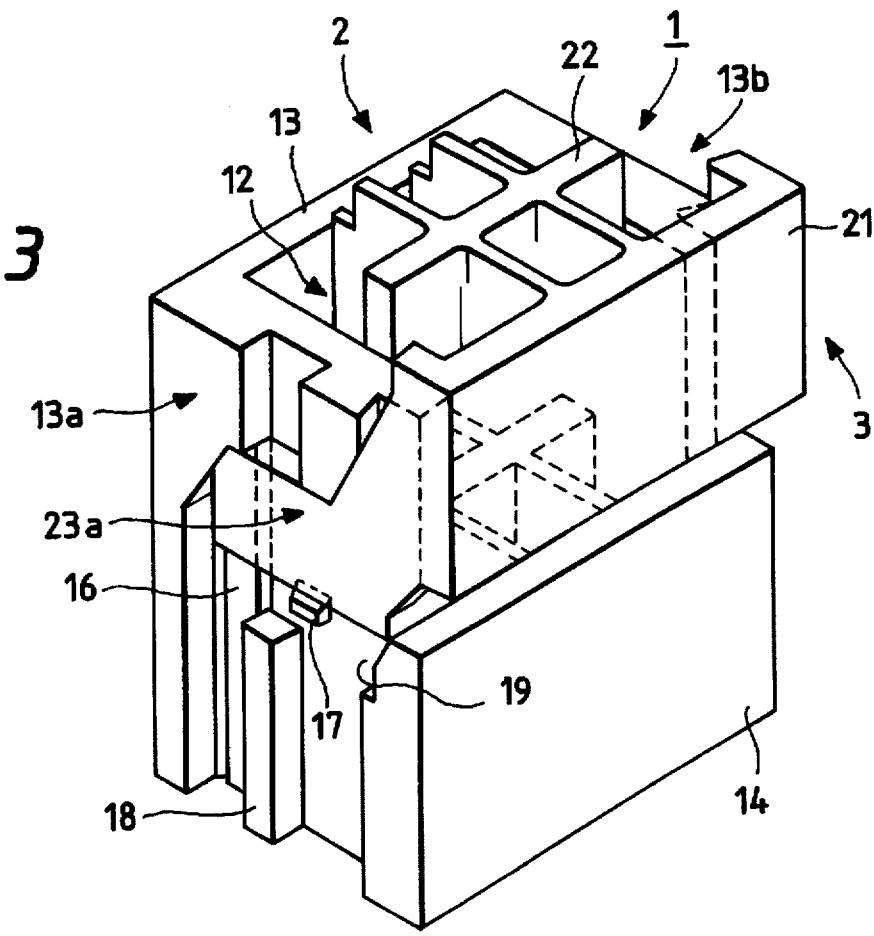
FIG. 3 is a perspective view showing a provisionally-retained condition of a rear holder.

For completely retaining the rear holder 3 on the housing 2, the rear holder 3 is further urged downward from the position shown in FIGS. 3 and 4 so as to engage the retaining projections 17 respectively in the retaining holes (formed respectively in the inner surfaces of the arms 23a and 23b). A sufficient force must be applied to enable the arms 23a and 23b to slide over the respective retaining projections 17, and as long as this force is not applied, the preset condition is stably maintained.

Figure 5:
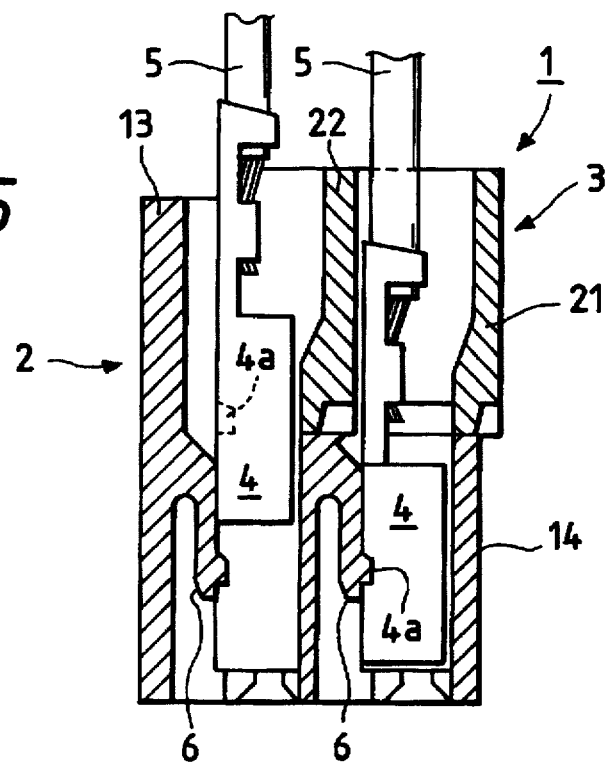
FIG. 5 is a cross-sectional view showing the insertion and retaining of connection terminals.
Figure 6:
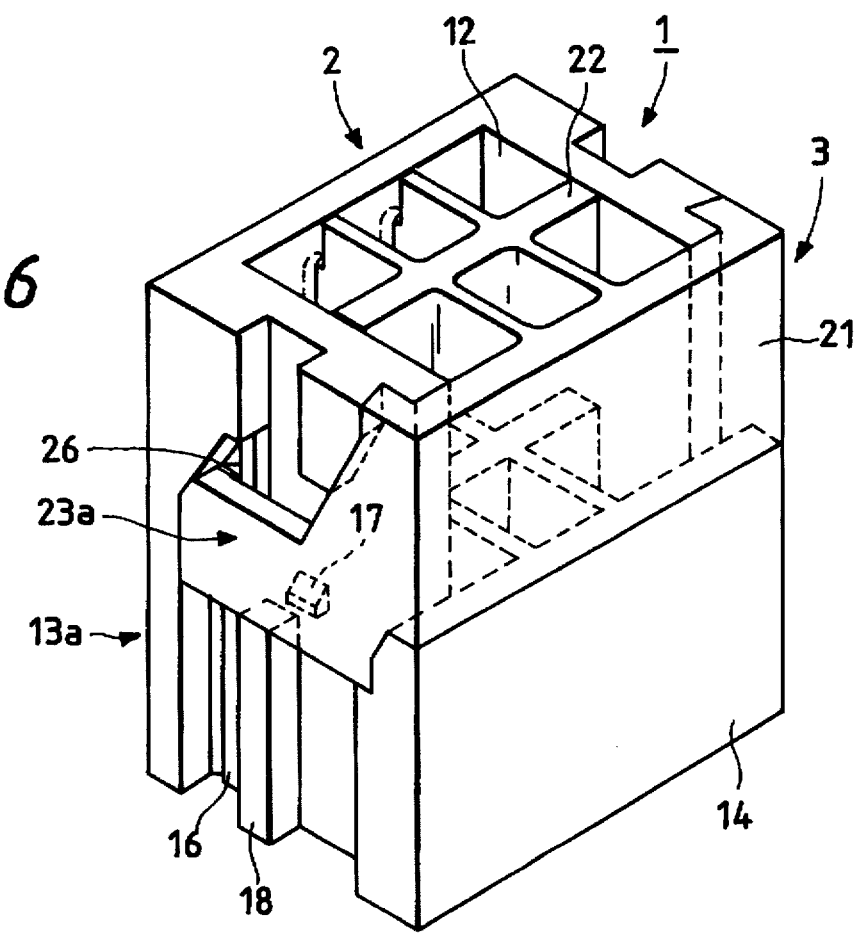
FIG. 6 is a perspective view of the housing, showing a completely-retained condition of the rear holder.

While the connector in this preset condition, the connection terminals 4 are inserted respectively into the terminal receiving chambers 12 in the housing 2, as shown in FIG. 5. In this condition, the terminal receiving chambers 12 in the housing 2 communicate respectively with the spaces separated from one another in the rear holder 3 by the partition wall 22.

When the connection terminal 4 is further inserted into the terminal receiving chamber 12 (see the left-hand chamber 12 in FIG. 5) against the resiliency of a retaining portion 6, the retaining portion 6 is retainingly engaged in a retaining portion 4a formed at one end portion of the connection terminal 4 (see the right-hand terminal receiving chamber 12 in FIG. 5), thereby retaining the connection terminal 4 against withdrawal. However, in the preset condition, the connection terminal 4 is retained only by the retaining portion 6, and the rear holder 3 is not completely retained on the housing 2.

When the rear holder 3 is urged downward, the rear holder 3 moves obliquely downward because of the guiding effect achieved by the abutment portions 15, the slanting surface portions 24 and so on. As a result, the lower ends of the arms 23a and 23b slide over the respective retaining projections 17, and then the retaining projections 17 are engaged respectively in the retaining holes formed respectively in the inner surfaces of the arms 23a and 23b, as indicated in broken lines in FIG. 6. At this time, the inwardly-directed retaining portions 26, formed respectively at the distal ends of the arms 23a and 23b, move downward while being kept engaged with the respective retaining projections 16.

After this operation, lower ends of the arms 23a and 23b rest respectively on the support portions 18, and the notch portions 27 are closely engaged with the positioning portions 19, respectively, and the wall 21 rests on the wall 14. Therefore, the housing 2 and the rear holder 3 will not be easily disengaged from each other.

Figure 7:
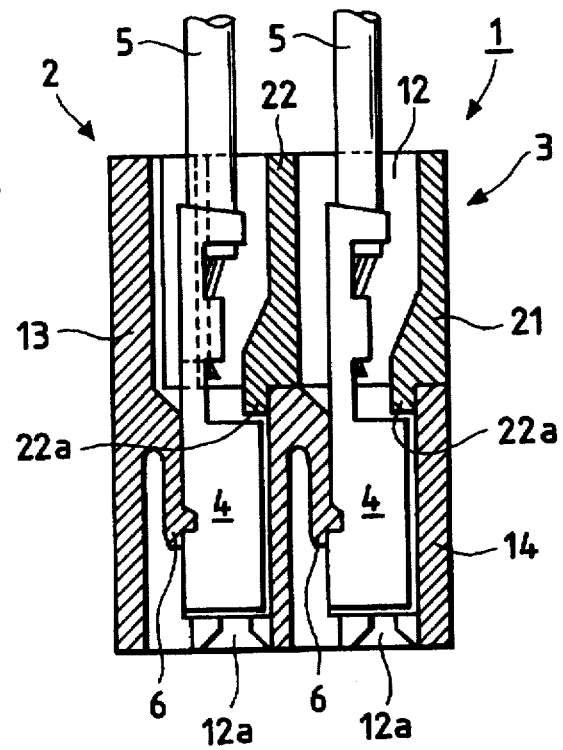
FIG. 7 is a cross-sectional view of the housing, showing the completely-retained condition of the rear holder.

When the housing and the rear holder are firmly connected together, retaining projections 22a, formed at the lower ends of the partition wall 22 and the wall 21, project into the terminal receiving chambers 12, respectively, as shown in FIG. 7. Therefore, when a force tending to withdraw the connection terminal 4 from the terminal receiving chamber 12 is applied, the retaining projection 22a, projected into the terminal receiving chamber 12, engages the connection terminal 4 to prevent the withdrawal of the terminal 4.

In the preset condition of the rear holder 3, the connection terminal 4 is retained through the retaining portion 4a. However, when the housing 2 and the rear holder 3 are firmly connected together, the connection terminal 4 is retained in a double manner by the retaining portion 4a and the retaining projection 22a, and is completely prevented from being withdrawn.

The terminal receiving chamber 12 has at one end a terminal insertion hole 12a through which a mating terminal (e.g. a male terminal) is inserted and connected to the connection terminal 4.

As described above, in the method of this embodiment for producing the connector with the rear holder, the housing and the rear holder are molded, and subsequently the rear holder is provisionally retained on the housing, using one of the molds. Therefore, the time and labor required for assembling the connector, as well as the cost for storage control of the parts, can be greatly reduced.

A method of producing a connector with a rear holder according to a second embodiment of the invention will now be described with reference to FIGS. 8 to 11. In this embodiment, a housing and rear holders, each connected to the housing through a hinge, are molded as an integral structure, and then the rear holders are preset on the housing while the housing is fixed at one end of the mold.

Figure 8:
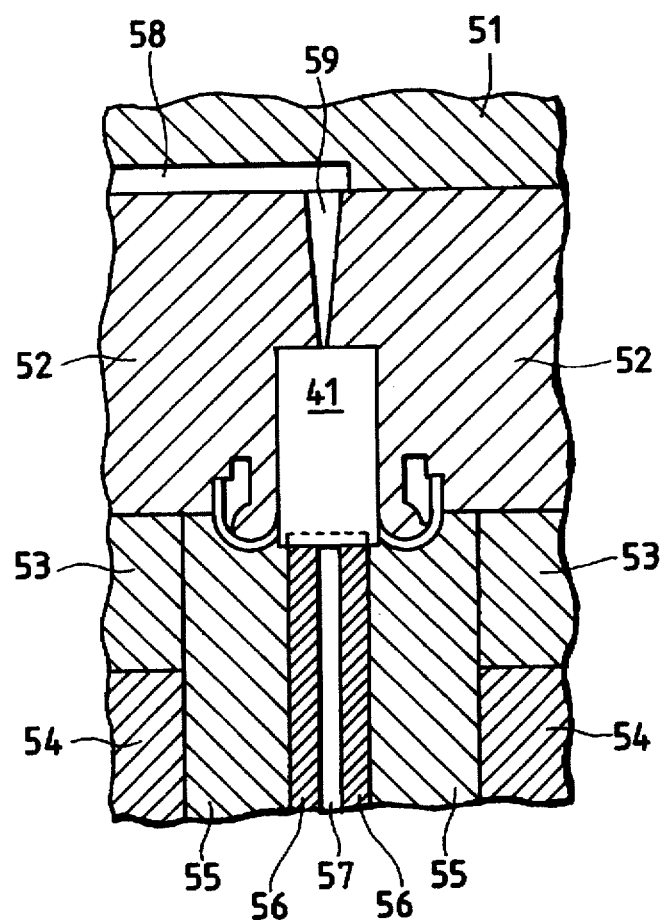
FIG. 8 is a schematic, cross-sectional view showing molds used in a second embodiment of the invention.

In this embodiment, the housing 41 has two rear holders 42a and 42b integrally formed thereon through the respective hinges 43a and 43b, as shown in FIG. 8. The mold structure for molding the housing 41 comprises mold plates 51, 52, 53 and 54, mold cores 55 and 56, and an ejector pin 57. A runner 58 for supplying a synthetic resin is formed in the mold plate 51, and there is provided a gate 59 connecting the runner 58 to a cavity for molding the housing 41.

The mold plates 51 and 52 are fixed, and the other molds including the mold 53 are movable. For molding the housing 41, the mold plates 51 to 54, the mold cores 55 and 56 and the ejector pin 57 are assembled together. The housing 41 is a cavity, and the synthetic resin fills this cavity through the runner 58 and the gate 59 to integrally form the housing 41, the rear holders 42a and 42b and the hinges 43a and 43b.

Figure 9:
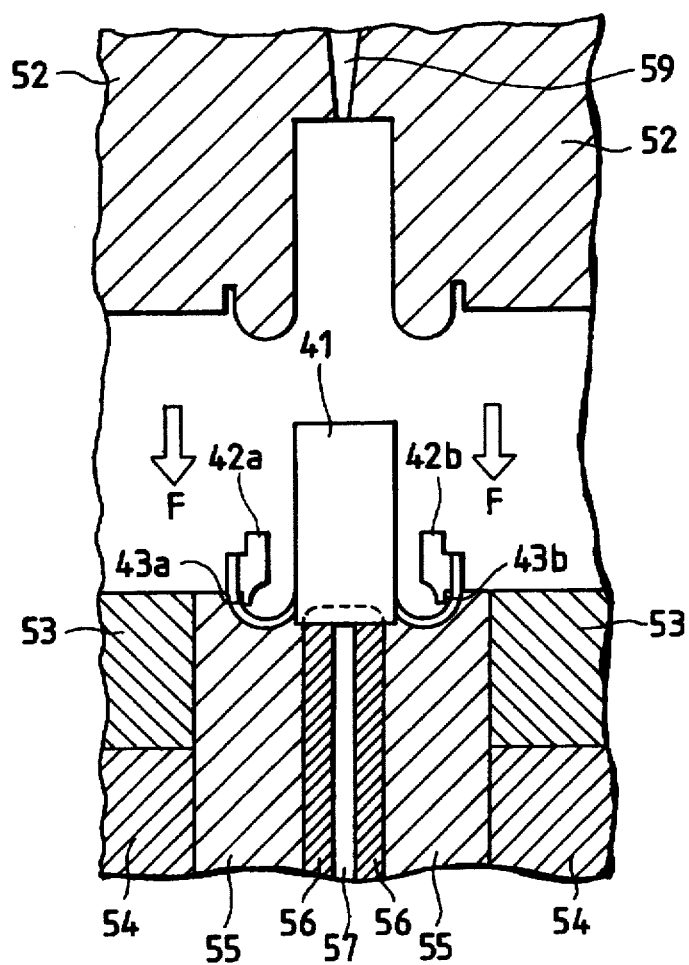
FIG. 9 a schematic, cross-sectional view of the molds of FIG. 8, showing the step of assembling a housing.

After the housing 41 is thus molded, the movable molds 53 to 57 are moved downward as indicated by arrow F in FIG. 9. At this time, the molded housing 41 moves downward together with the movable molds. As a result, the housing 41 is exposed, together with the rear holders 42a and 42b and the hinges 43a and 43b, on the movable molds such that the housing 41 is supported upright on the mold core 56.

Figure 10:
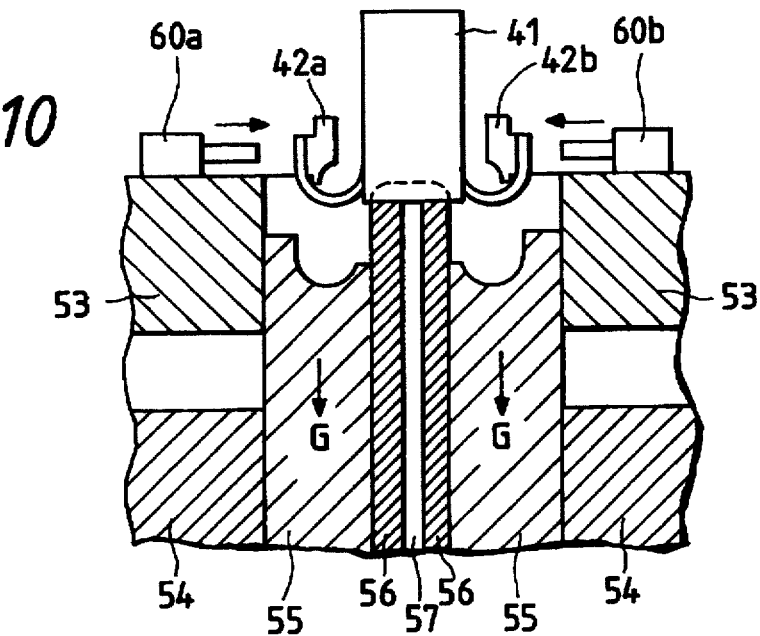
FIG. 10 is a cross-sectional view showing the step of connecting rear holders.
Figure 11:
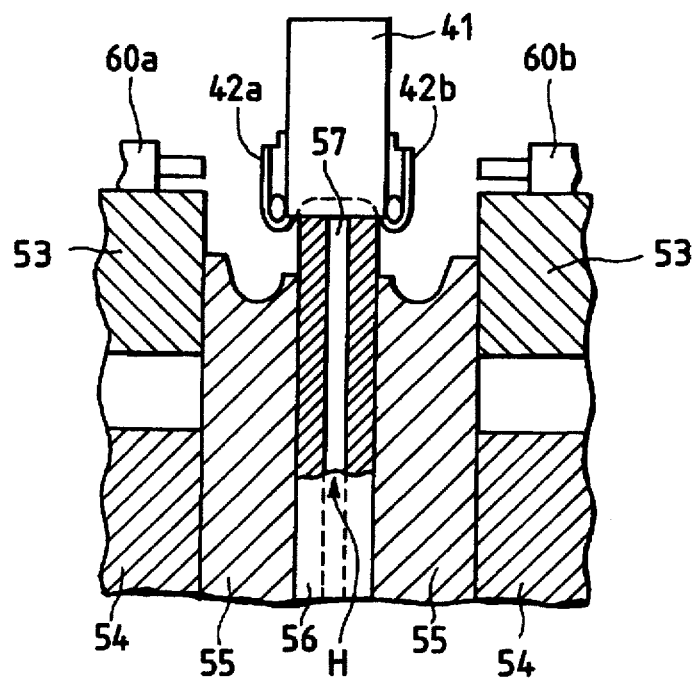
FIG. 11 is a cross-sectional view showing the removal of the housing.

First, the mold core 55 is moved downward in a direction of arrow G as shown in FIG. 10, thereby releasing the support of the hinges 43a and 43b, so that these hinges can be deformed. Then, cylinders 60a and 60b are moved along the upper surface of the mold 53 toward the rear holders 42a and 42b, respectively, from the opposite sides of the housing 41. Then, the rear holders 42a and 42b are urged toward the housing 41 by the respective cylinders 60a and 60b, and are provisionally retained on the housing 41.

Finally, the ejector pin 57 is moved upward (as indicated by arrow H in FIG. 11) to urge the housing 41 upward, thereby removing the housing 41 from the mold core 56, and the process proceeds to a subsequent step, that is, a connection terminal-inserting step.

As described above, in this embodiment, the housing is molded integrally with the rear holders, and the rear holders are provisionally retained (that is, preset) on the housing while the housing is held on the mold, and therefore the advantages described in connection with the first embodiment can be achieved.

A method of producing a connector with a rear holder according to a third embodiment of the invention will now be described with reference to FIGS. 12 to 15.

Figure 12:
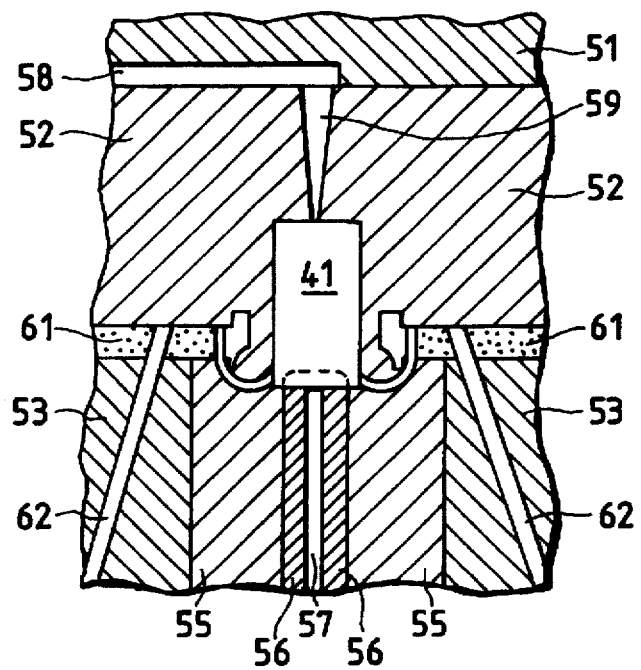
FIG. 12 is a schematic, cross-sectional view showing molds used in a third embodiment of the invention.

This embodiment differs from the second embodiment in the construction and manner of presetting the rear holders. More specifically, as shown in FIG. 12, the housing 41 of this embodiment has the two rear holders 42a and 42b integrally formed therewith through respective hinges 43a and 43b as in the second embodiment. The mold structure for molding the housing 41 comprises mold plates 51, 52, 53 and 61, mold cores 55 and 56, and an ejector pin 57. A runner 58 for supplying a synthetic resin is formed in the mold plate 51, and there is provided a gate 59 connecting the runner 58 to a cavity for molding the housing 41. In this embodiment, there are also provided slide pins 62 inserted obliquely through the mold plates 53 and 61.

In the above mold structure, the mold plates 51 and 52 are fixed, and the other molds including the mold plates 61 are movable. For molding the housing 41, the mold plates 51 to 61, the mold cores 55 and 56 and the ejector pin 57 are assembled together. The housing 41 is a cavity, and the synthetic resin fills this cavity through the runner 58 and the gate 59 to integrally form the housing 41, the rear holders 42a and 42b and the hinges 43a and 43b.

Figure 13:
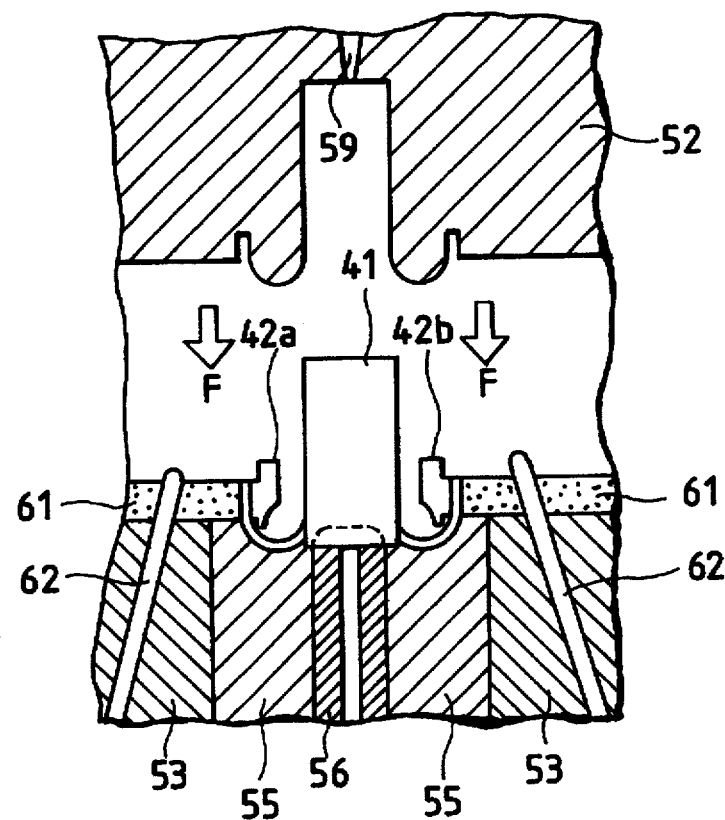
FIG. 13 is a schematic, cross-sectional view of the molds of FIG. 12, showing the step of assembling a housing.

After the housing 41 is thus molded, the movable molds including the mold plates 61 are moved downward as indicated by arrow F in FIG. 13, so that the molded housing 41 moves downward together with the movable molds. As a result, the housing 41 is exposed, together with the rear holders 42a and 42b and the hinges 43a and 43b, on the movable molds such that the housing 41 is supported upright on the mold core 56.

Figure 14:
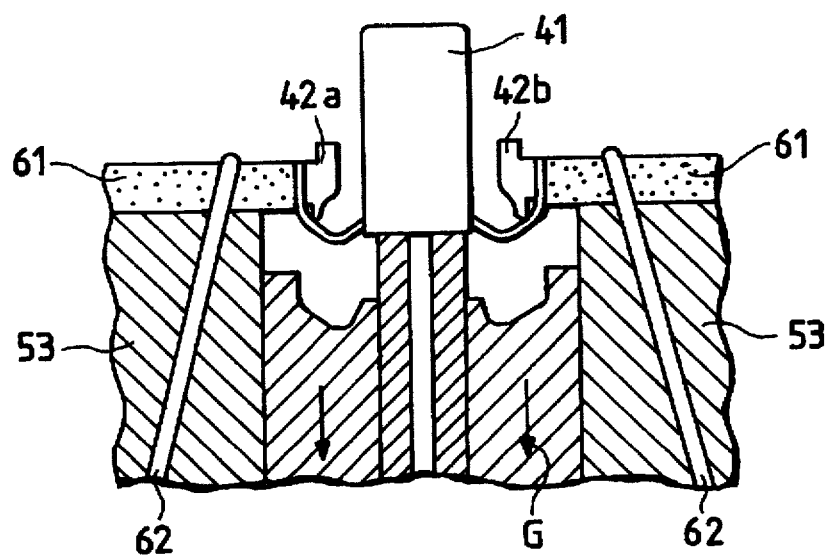
FIG. 14 is a cross-sectional view showing the step of connecting rear holders.
Figure 15:
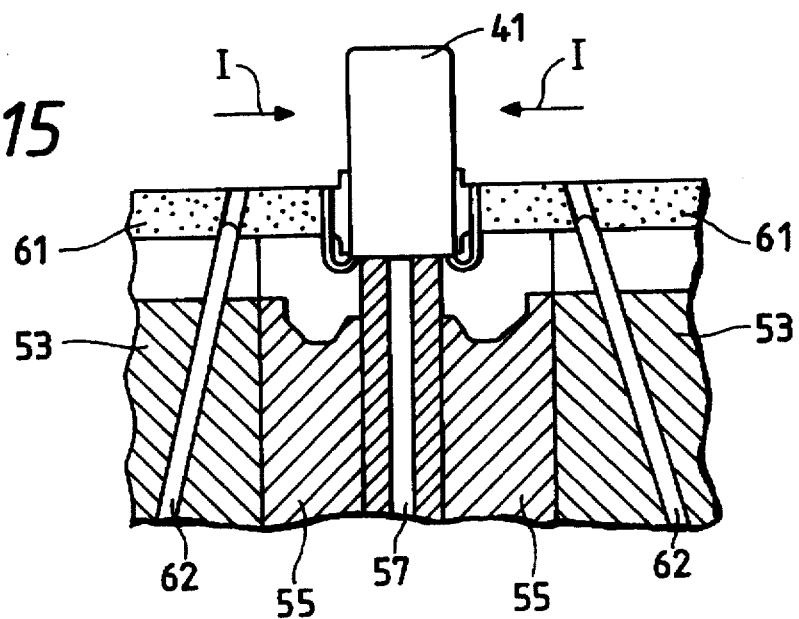
FIG. 15 is a cross-sectional view showing the step of connecting the rear holders.

Then, the mold core 55 is moved downward in a direction of arrow G as shown in FIG. 14, thereby releasing the support of the hinges 43a and 43b, so that these hinges can be deformed. Then, as shown in FIG. 15, the mold plate 53, the mold plates 61 and the ejector pin 57 are moved upward in unison while the slide pins 62 are kept fixed. Since the slide pins 62 are inclined at a predetermined angle, the mold plates 61 slide toward the housing 41 as indicated by arrows I, and respectively press the rear holders 42a and 42b toward the housing 41.

The amount of sliding movement of the mold plate 61 at this time is determined by the inclination angle and length of the slide pin 62, and in this embodiment the mold plates 61 are stopped when the rear holders 42a and 42b are preset (i.e. engaged with the housing 41).

Then, the ejector pin 57 is moved upward to urge the housing 41 upward, thereby removing the housing 41 from the mold core 56, and the process proceeds to a subsequent connection terminal-inserting step.

In this embodiment, the housing and the rear holders are integrally molded, and the rear holders are provisionally retained on the housing while the housing is held on the mold, and therefore the advantages described in connection with the first and second embodiments can be achieved.

A method of producing a connector with a rear holder according to a fourth embodiment of the invention will now be described with reference to FIGS. 16 to 19. The connector of this embodiment is different in construction from the above-mentioned conventional connector with a rear holder shown in FIGS. 24 to 27.

Figure 16:
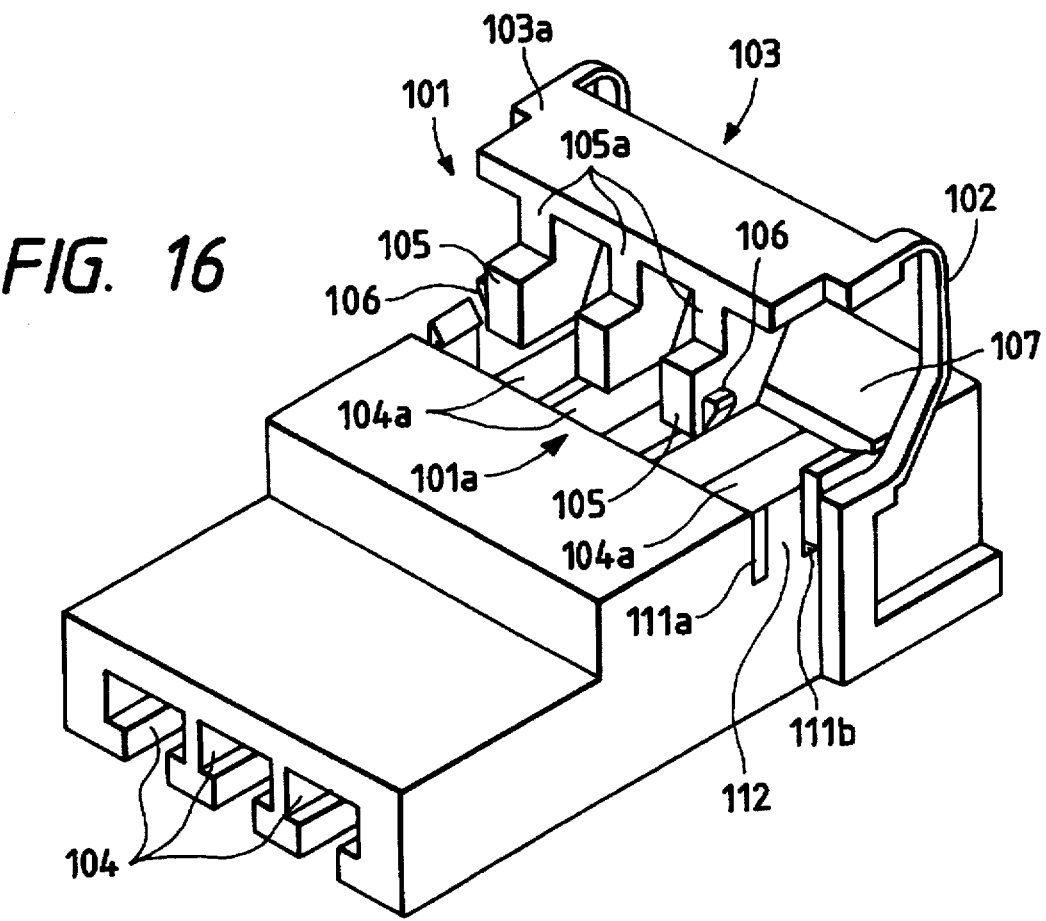
FIG. 16 is a perspective view showing the construction of a housing of a fourth embodiment of the invention.

As shown in FIG. 16, the rear holder 103 is integrally connected to the upper side of a rear portion of the connector housing 101 through flexible hinges 102, and a shallow receiving recess 101a for receiving a main plate 103a of the rear holder 103 is formed in a rear end portion of the upper wall of the connector housing 101. Upper openings 104a of a plurality of terminal receiving chambers 104 are open to this receiving recess 101a, and terminal retaining projections 105, corresponding respectively to the openings 104a, are formed on the inner or lower side of the rear holder 103.

Each terminal retaining projection 105 is connected to the rear holder main plate 103a through a connecting portion 105a, and projects forward beyond the rear holder main plate 103a. Provisionally-retaining projections 106 are formed respectively on outer sides of the terminal retaining projections 105, and the width of the terminal retaining projection 105, including the provisionally-retaining projection 106, is slightly smaller than the width of the opening 204a.

Two slits 111a and 111b, spaced a predetermined distance from each other, are formed in that portion of each of opposite side walls of the housing 101 disposed in registry with the receiving recess 101a. That portion of this side wall lying between the two slits 111a and 111b serves as a provisionally-retaining portion 112.

Figure 17:
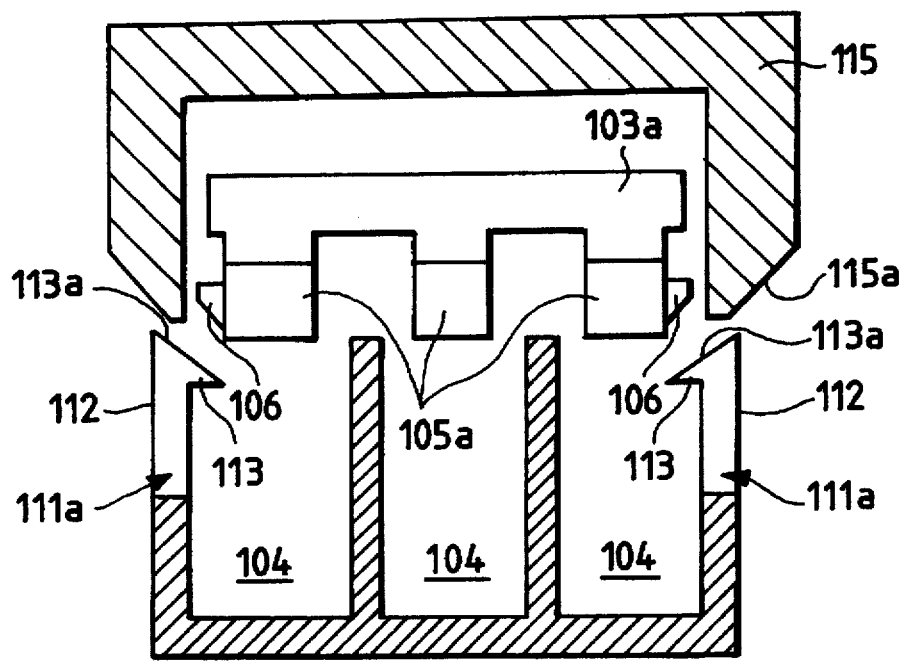
FIG. 17 is a schematic, cross-sectional view showing the housing and molds.
Figure 18:
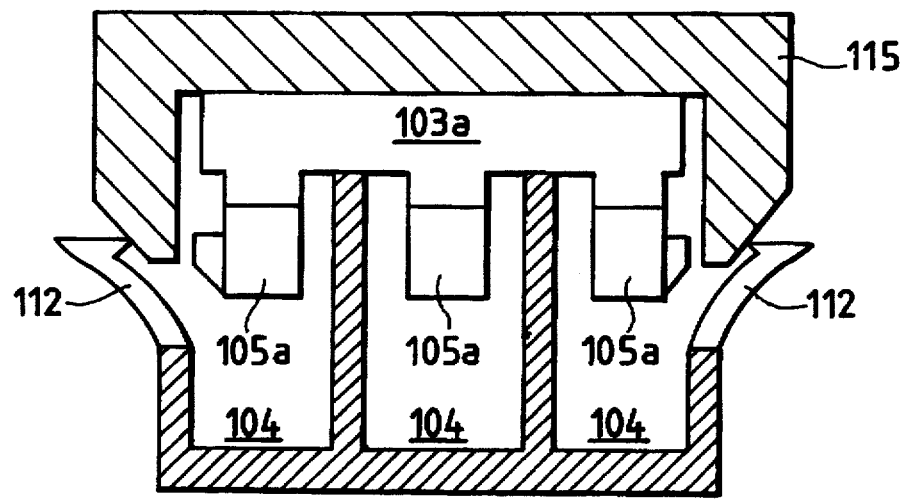
FIG. 18 is a schematic, cross-sectional view of the molds and the housing, showing the retaining of a rear holder.
Figure 19:
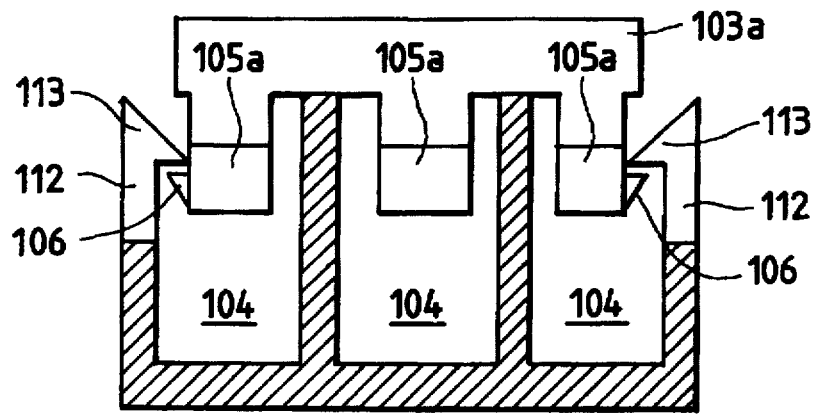
FIG. 19 is a schematic, cross-sectional view showing the retaining of the rear holder on the housing.

This provisionally-retaining portion 112 is generally in the form of a plate as shown in FIGS. 17 to 19, and is elastically deformable. A retaining pawl 113 is formed on an inner surface of the provisionally-retaining portion 112 at an upper end thereof, and this retaining pawl 113 has an upper surface 113a slanting inwardly from the outer side toward the receiving recess 101a.

When the connector is to be assembled, that is, when the rear holder 103 is to be connected to the housing 101, a mold 115 (see, for example, FIG. 17) used for molding the housing 101, or an assembling jig (not shown) is used.

After the housing 101 is injection molded as shown in FIG. 17, the mold 115 is moved downward as shown in FIG. 18, so that slanting surfaces 115a, formed respectively at opposite sides of this mold 115, are brought into contact with the slanting surfaces 113a of the retaining pawls 113, respectively, and then the mold 115 is further moved downward. As a result, the whole of the rear holder 103 is moved downward by the mold 115, and the provisionally-retaining portions 112 are deformed away from each other, and the terminal retaining projections 105 are disposed between the provisionally-retaining portions 112.

Thus, the retaining pawls 113 are forced away from each other together with the provisionally-retaining portions 112, and the rear holder 103 is moved downward into a predetermined position, and then the mold 115 is moved upward, thereby releasing the force urging the provisionally-retaining portions 112 away from each other. As a result, the provisionally-retaining portions 112 move inward because of their elastic nature, so that the retaining pawls 113 engage the provisionally-retaining projections 106, respectively, as shown in FIG. 19.

When the rear holder 103 is further urged downward, the rear holder 103 is retained on the housing 101 as described above for the conventional connector, thereby preventing connection terminals (not shown) from withdrawal.

Figure 20:
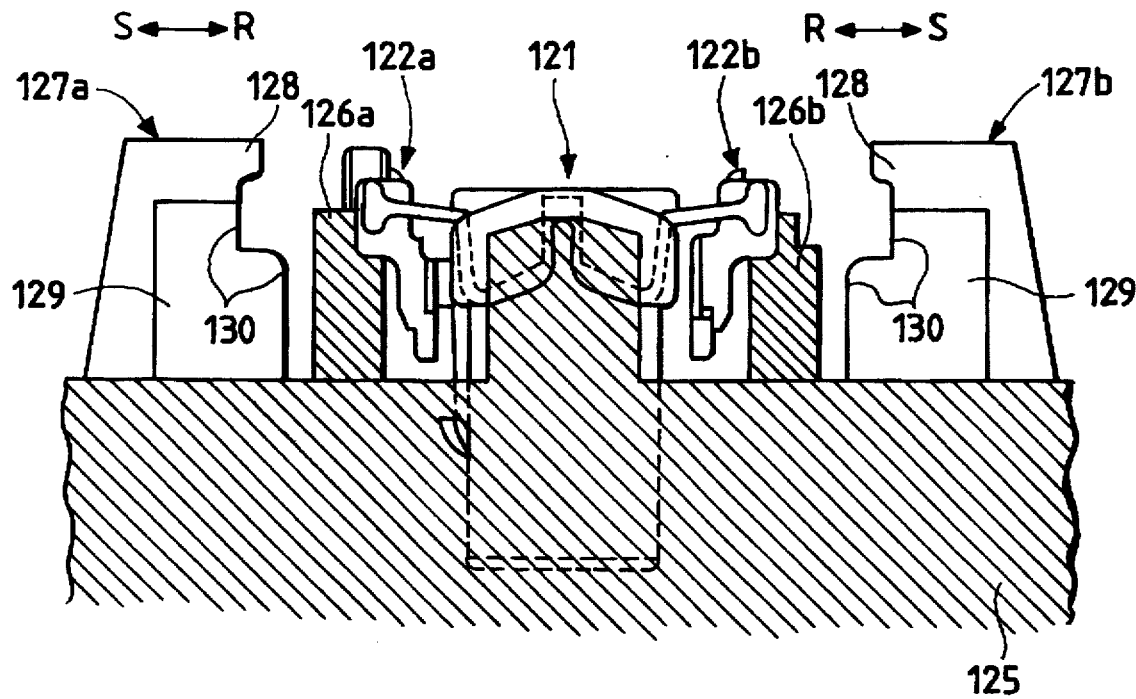
FIG. 20 is a schematic, cross-sectional view of molds and a housing of a fifth embodiment of the invention.

A method of producing a connector with a rear holder according to a fifth embodiment of the invention will now be described with reference to FIGS. 20 and 21. In this embodiment, after a housing 121 is injection molded, rear holders 122a and 122b are connected to this housing. An upper mold used for the injection molding is not shown.

A movable mold 125 corresponds to the movable molds (including the mold 53) of the second embodiment. Comparing this embodiment with the second embodiment, the rear holders 43a and 42b are connected to the lower portion of the housing 41 in the second embodiment, whereas the rear holders 122a and 122b are connected to an upper portion of the housing 121 in this embodiment.

A pair of rear holder support portions 126a and 126b are formed on and project from the upper surface of the mold 125. The rear holders 122a and 122b are supported respectively on the pair of rear holder support portions 126a and 126b, and therefore will not hang down or be deformed, and the rear holders 122a and 122b, formed on the upper portion of the housing 121 in an overhung manner, are properly positioned.

Sliders 127a and 127b are mounted on the mold 125 for reciprocal movement in the directions of arrows R and S. The sliders 127a and 127b are used for connecting the rear holders 122a and 122b to the housing 121, and each of these sliders has a press portion 128 for engaging a portion of the rear holder (corresponding, for example, to the main plate 103a in the fourth embodiment) to press the rear holder in the direction of arrow R, and a receiving recess 129 for receiving the rear holder support portion 126a, 126b when the slider is moved in the direction of arrow R. Opposite ends (only one end is shown in FIGS. 20 and 21) of each of the sliders 127a and 127b serve as press portions 130 for pressing the whole of the rear holder 122a and 122b. When the sliders 127a and 127b are moved in the direction of arrow R, the rear holders 122a and 122b are smoothly urged toward the housing 21 by the press portions 128 and 130.

Next, the connection of the rear holders 122a and 122b to the housing 121 will be described. After the housing 121 is molded, the upper mold (not shown) is removed, and at this stage the rear holders 122a and 122b are supported and properly positioned respectively on the rear holder support portions 126a and 126b, as shown in FIG. 20.

Figure 21:
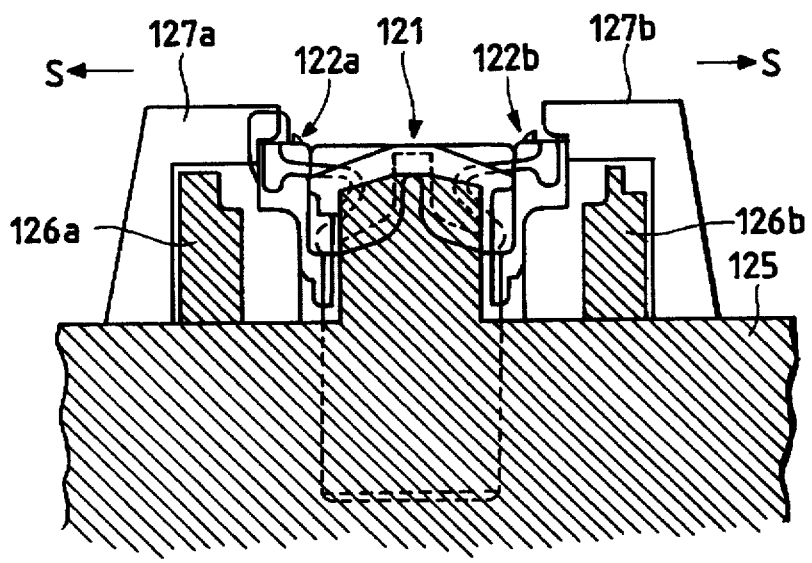
FIG. 21 is a schematic, cross-sectional view showing the step of connecting rear holders.
Figure 22:
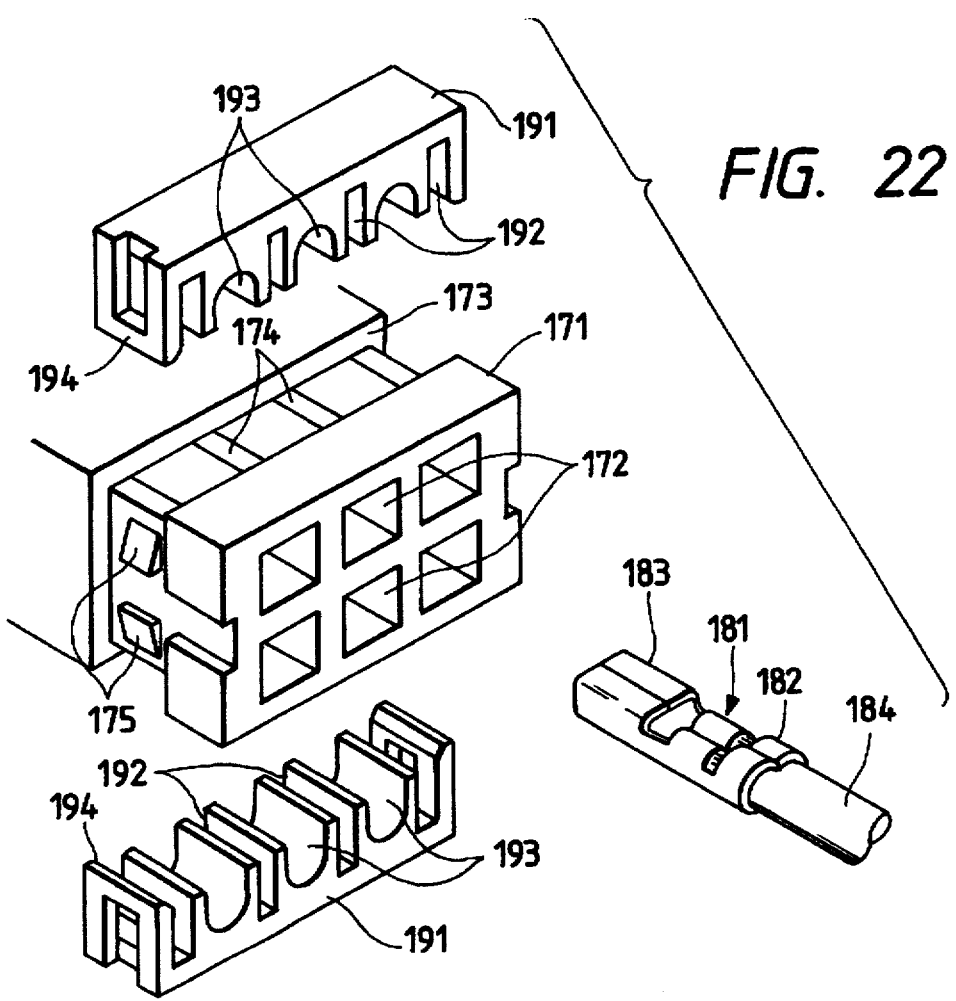
FIG. 22 is a perspective view of a first example of a conventional connector.
Figure 23:
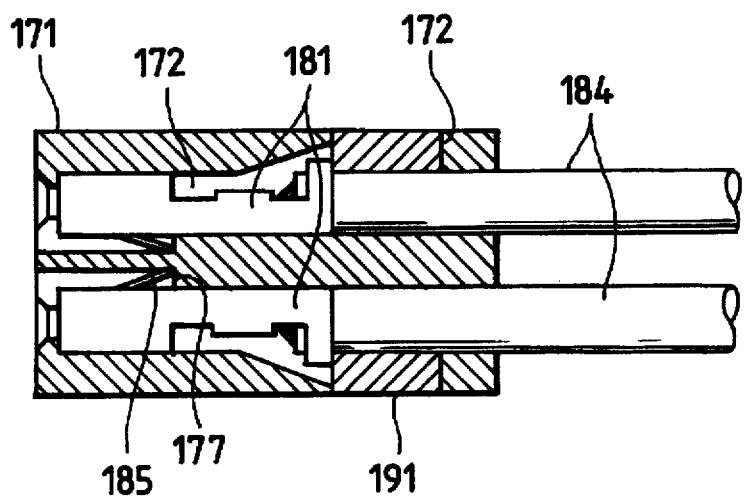
FIG. 23 is a cross-sectional view showing the retaining of a connector terminal.
Figure 24:
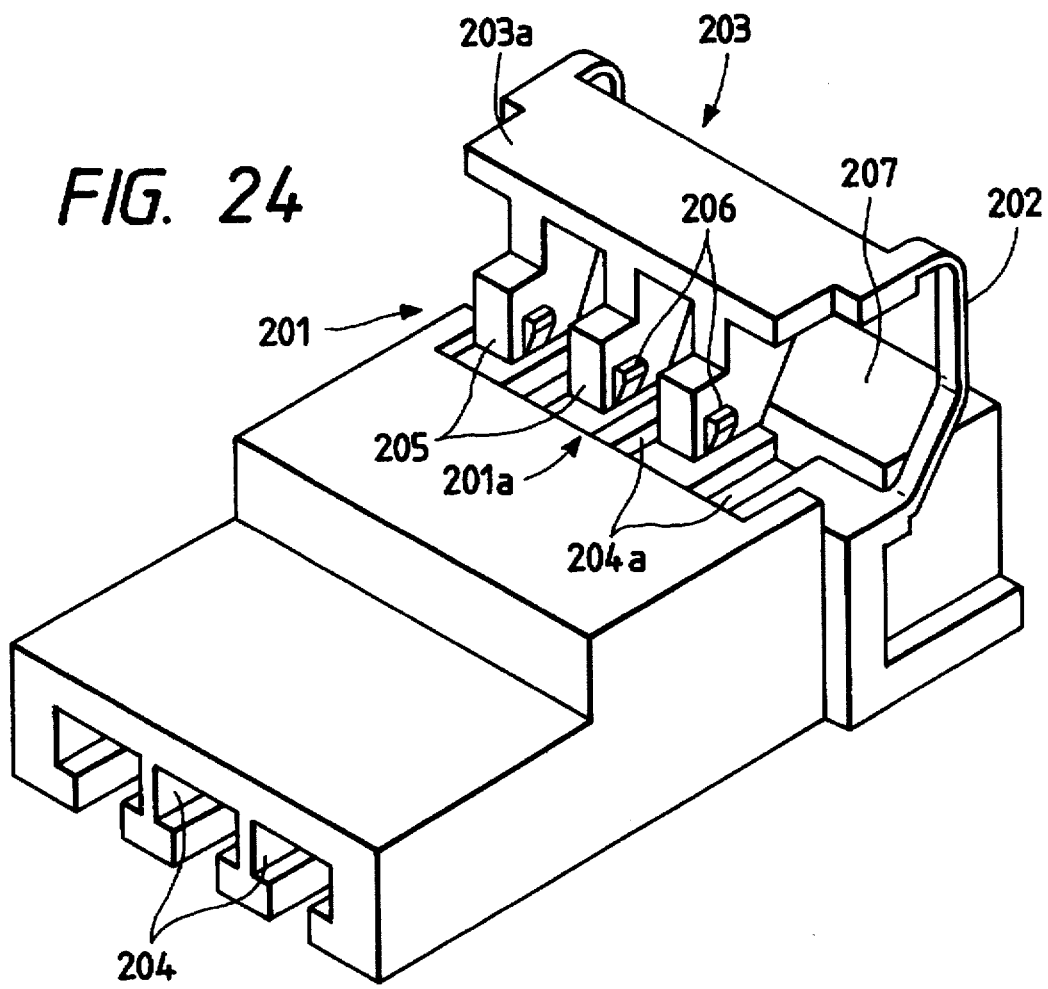
FIG. 24 is a perspective view of a second example of a conventional connector.
Figure 25:
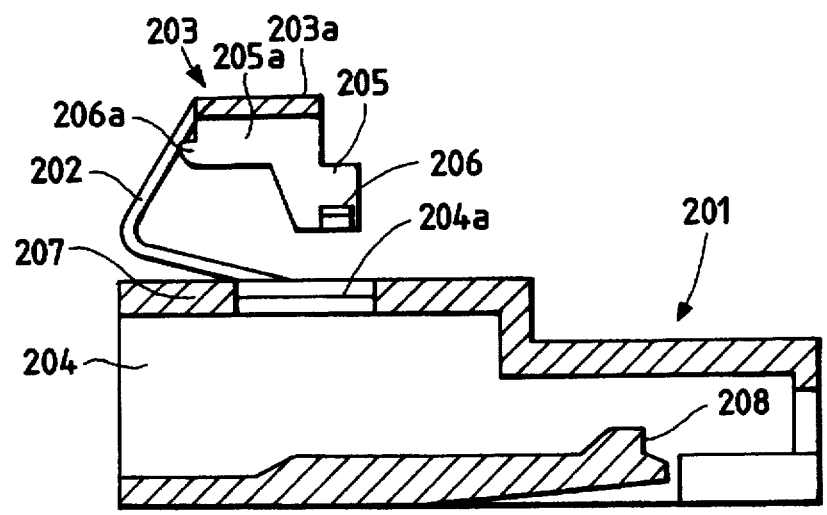
FIG. 25 is a cross-sectional view showing the construction of a rear holder.
Figure 26:
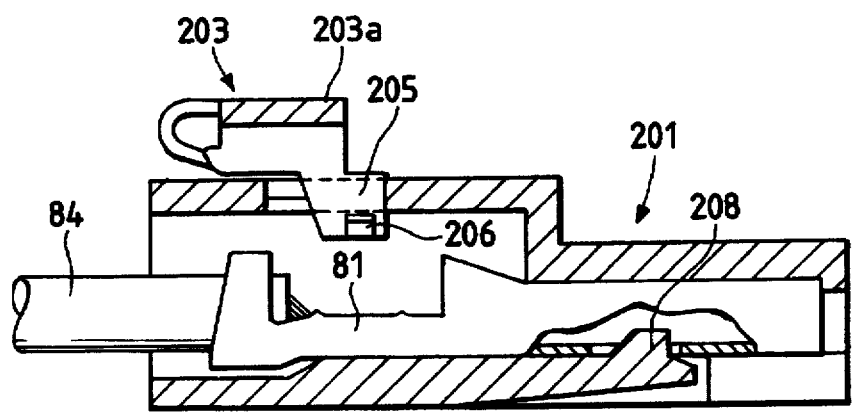
FIG. 26 is a cross-sectional view showing a provisionally-retained condition of the rear holder.
Figure 27:
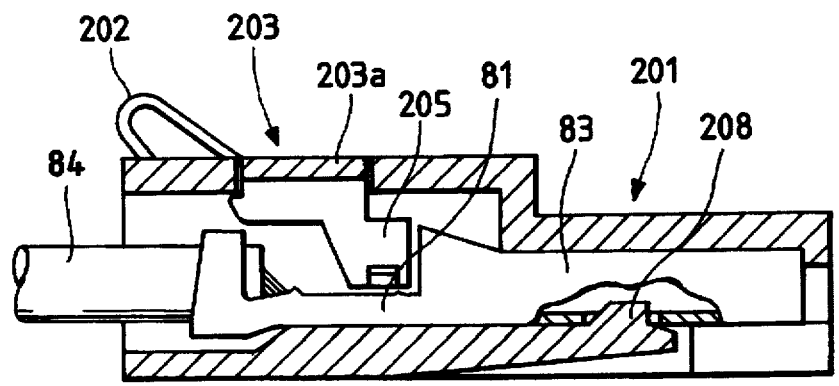
FIG. 27 is a cross-sectional view showing a completely-retained condition of the rear holder.

When the sliders 127a and 127b are moved in the direction of arrow R, the rear holders 122a and 122b are urged toward the housing 121, and are retained on the housing 121, as shown in FIG. 21. Then, when the sliders 127a and 127b are moved in the direction of arrow S, the housing 121, having the rear holders 122a and 122b retained thereon, can be removed from the mold 125.

Thus, in this embodiment, the rear holders 122a and 122b can be properly positioned and retained on the housing 121, the retaining operation can be smoothly performed, and damage to the parts can be prevented.

While the invention has been described in detail and with reference to specific embodiments thereof, it will be apparent to those skilled in the art that various changes and modifications may be made therein without departing from the spirit and scope of the invention.

What is claimed is:

1. A method of producing a connector with a rear holder wherein a plurality of connection terminals are received in a connector housing, and are retained in a double manner by the rear holder, comprising the steps of:

molding the connector housing and the rear holder using a set of molds comprising a first mold disposed between an inner side of the connector housing and an inner side of the rear housing, and a second mold adjacent to an outer side of the rear holder;

moving the first mold to form a space between the connector housing and the rear holder; and urging the second mold to move the rear holder to engage the connector housing, to provisionally retaining the rear holder on the connector housing.

2. A method of producing a connector with a rear holder wherein a plurality of connection terminals are retained in a double manner by a connector housing and the rear holder, comprising the steps of:

molding the connector housing and the rear holder integrally with each other using a set of molds comprising a resin-pouring mold and a rear holder holding mold for integrally molding the connector housing and the rear holder such that the connector housing and the rear holder are connected together through a flexibly deformable hinge;

moving the resin-pouring mold to expose the connector housing and the rear holder;

moving the rear holder holding mold, thereby allowing the hinge to be flexibly deformed; and urging the rear holder to engage the connector housing, to provisionally retaining the rear holder on the connector housing.

3. The method of producing a connector with a rear holder according to claim 2, further comprising the steps of supporting the connector housing after the rear holder is engaged with the connector housing, and driving an ejector pin provided in the set of molds to remove the connector housing from the set of molds.

4. A method of producing a connector with a rear holder wherein a plurality of connection terminals are received in a connector housing, and are retained in a double manner by the rear holder, comprising the steps of molding the connector housing and the rear holder integrally with each other, such that the connector housing and the rear holder are connected together through a hinge, using a set of molds comprising a first mold for receiving resin to mold the connector housing and the rear holder, a second mold for holding the rear holder, and a third mold disposed adjacent to an outer surface of said second mold and having a slide pin passed therethrough;

moving the first mold to expose the connector housing and the rear holder;

moving the second mold, thereby allowing the hinge to be flexibly deformed; and moving the third mold toward the connector housing to urge the rear holder to engage the connector housing, to provisionally retaining the rear holder on the connector housing.

5. A method of producing a connector with a rear holder wherein a plurality of connection terminals are received in a connector housing, and are retained in a double manner by the rear holder, comprising the steps of elastically deforming a pair of elastic, provisionally-retaining portions, formed on the connector housing, away from each other by a mold for molding the connector housing;

moving the mold to urge the rear holder to be located between the pair of provisionally-retaining portions; and retainingly engaging the rear holder to the connector housing with the provisionally-retaining portions.

6. A method of producing a connector with a rear holder wherein a plurality of connection terminals are received in a connector housing, and are retained in a double manner by the rear holder, comprising the steps of positioning the rear holder, molded integrally with the connector housing, by a rear holder support portion formed on a mold for molding the connector housing; and urging the rear holder towards the connector housing using a slider, reciprocally movably mounted on the mold, provisionally retain the rear holder on the connector housing.

* * * * *